United States Patent [19]
Richter

[11] Patent Number: 6,091,454
[45] Date of Patent: Jul. 18, 2000

[54] METHOD AND APPARATUS FOR DISPLAYING IMAGES HAVING ADJACENT HORIZONTAL BLOCKS WITH SHARP CONTRAST ON A DISPLAY UNIT OF A TELEVISION SYSTEM

[75] Inventor: Bryan Michael Richter, Fremont, Calif.

[73] Assignee: TeleCruz Technology, Inc., San Jose, Calif.

[21] Appl. No.: 09/001,411

[22] Filed: Dec. 31, 1997

[51] Int. Cl.[7] .................................................... H04N 5/68
[52] U.S. Cl. ........................................... 348/377; 348/678
[58] Field of Search ..................................... 348/189, 177, 348/806, 678, 377, 378, 379, 380, 381, 382

[56] References Cited

U.S. PATENT DOCUMENTS

| | | | |
|---|---|---|---|
| 4,979,044 | 12/1990 | Hong | 348/380 |
| 5,367,231 | 11/1994 | Kobayashi et al. | 315/383 |
| 5,424,780 | 6/1995 | Cooper | 348/428 |

*Primary Examiner*—Andrew I. Faile
*Assistant Examiner*—Sam Huang
*Attorney, Agent, or Firm*—Law Firm of Naren Thappeta

[57] ABSTRACT

A television system for displaying images having adjacent horizontal blocks with sharp contrast. In general, such sharp contrasts can cause the drive voltage (Hv) applied to an anode of a CRT display unit to change. The changes typically result in distortions in the displayed images. A correction logic is employed to regulate the voltage source that supplies the voltage to the anode of the CRT display unit. The correction logic examines the digital data representation of the images to determine the extent of contrast, and supplies a corresponding correction voltage to regulate the voltage source. Due to the correction voltage, a constant drive voltage is supplied to the anode. The distortions are thus minimized or eliminated.

15 Claims, 4 Drawing Sheets

METHOD AND APPARATUS FOR DISPLAYING IMAGES HAVING ADJACENT HORIZONTAL BLOCKS WITH SHARP CONTRAST ON A DISPLAY UNIT OF A TELEVISION SYSTEM

RELATED APPLICATIONS

The present invention is related to the following applications, which are incorporated in their entirety herewith:

1. Co-pending Unites States patent application entitled, "A Method and Apparatus for Enabling a User to Access Data Network applications from a Television System", Ser. No. 08/867,203, filed Jun. 2, 1997 (hereafter RELATED APPLICATION 1); and
2. Co-pending United States patent application entitled, "A Method and Apparatus for Reducing Flicker in the Television Display of Network Application Data", Serial Number UNASSIGNED, Filed on Even Date Herewith, and having attorney docket number: TCRZ-0002 (hereafter "RELATED APPLICATION 2").

BACKGROUND OF THE INVENTION

1. Field of the Invention

The present invention relates to television systems, and more specifically to a method and apparatus for displaying images having adjacent horizontal blocks with sharp contrast on a cathode ray tube (CRT) display unit of a television system.

2. Related Art

Television systems often include cathode ray tube (CRT) based display units (hereafter "CRT display units") for displaying images. A typical CRT display unit usually includes a display screen coated with electro-luminescent material such as phosphorous. Bombarding (or actuating) this electro-luminescent material with electrons at a given point causes the material to glow at that point. The intensity of the bombarded point is typically proportional to the number of electrons (or the strength of the current) bombarding that point.

To display an image encoded in a display signal, the display screen is scanned according to a received display screen. Scanning generally refers to the process of bombarding each point (coated with electro-luminescent material) on the display screen. As can be readily appreciated from the description above, such bombardment causes the bombarded point to glow. To achieve colors, each point (or a small area) can include multiple types of materials which glow in different primary colors (e.g., red, blue, green), and a range of different colors can be attained at individual points by combining these primary colors with various intensities as is well known in the art. The glowing of all the points on a display screen defines an image frame on the display screen. Thus, the images encoded in a received display signal can be displayed on a display screen by scanning the display screen according to a received display signal.

The scanning function is usually achieved by a combined operation of an electron source, an anode, a cathode, and deflection coils as described now. The electron source commonly generates electrons which are proportional in number to the desired intensity at a given time on a given point of the display screen. The desired intensity is in turn determined by the received display signal.

An electric field is typically generated between the anode and the cathode by applying a high voltage to the anode. The electric field causes the electrons generated by the electron source to be attracted in the direction of the anode. The anode usually has shadow perforations, which allow electrons to pass through and bombard the display screen generally located behind the anode.

As the electrons move towards the anode, the deflection coils cause the electrons to be deflected in both horizontal and vertical directions such that the desired point on the display screen is bombarded. The desired point is usually determined by the synchronization signals which provide spatial reference to the display portion of the received display signal. Thus, the desired point to bombard and the color/intensity of the desired point are determined according to the contents of the received display signal to generate images encoded in the display signal.

The above described scanning scheme may not be suitable when displaying images having adjacent horizontal blocks with sharp contrast. As an illustration, when several consecutive white horizontal lines as a block are present followed by several consecutive black horizontal lines as a block, the above described scheme may not be suitable. Such sharp contrast blocks in images may be encountered, for example, when displaying data or information suitable for computer systems. As will be explained below, the image to be displayed may be incorrectly distorted due to the sharp contrast blocks, and such distortions may not be acceptable.

The reason for the above noted distortion can be understood by appreciating that the deflection coils typically deflect the passing electrons relatively more if the electrons are moving slower, and deflect the electrons relatively less if the electrons are moving faster. In turn, the speed of the electrons is determined by the voltage level at the anode (assuming that the cathode is grounded). The variance in deflection is a result of the amount of time individual electrons are subjected to the deflection field during travel to the anode.

Unfortunately, the electrons moving towards the anode constitutes electric current and can affect the voltage level at the anode. As noted above, the number of electrons (and thus the electric current level between anode and cathode) is determined by the desired intensity level of the image at the corresponding point. Accordingly, there exists relatively larger electric current level when image portions having high intensity level are displayed.

When a relatively stronger electric current is present, the voltage level at the anode may become correspondingly lower. As a result of the lower voltage level, the electrons travel at a correspondingly lower speed. As noted above, electrons traveling at slower speeds are amenable to greater deflection. Similarly, when image portions with lower intensity are displayed, the voltage will be higher and the corresponding electrons may be deflected less.

The difference in deflection levels may not generally be a problem in conventional television systems as the images in television signals usually do not contain horizontal blocks with sharp contrast. However, when the television system is used to display images having horizontal blocks with sharp contrast, the difference in deflection levels can distort the overall images as the deflection levels vary from one image portion to the other. This distortion may not be acceptable in certain situations. For example, if the television system is used to access services such as web-browsing and electronic mail, the distortions can be unacceptably significant as the displayed data can include horizontal blocks with sharp contrast.

Therefore, what is required is a method and apparatus which minimizes or eliminates such distortions caused by the presence of horizontal blocks with sharp contrast in the displayed images.

SUMMARY OF THE INVENTION

The present invention is directed to a method and apparatus for displaying images having horizontal blocks with sharp color contrast on a display unit of a television system. The television system includes a voltage source which supplies voltage signals to a display unit. The display unit displays the images using the supplied voltage.

The display of images with horizontal blocks with sharp color contrast causes the voltage level of the voltage signal to change, and these changes may introduce distortions in the displayed images. A correction circuit regulates the voltage source in accordance with the present invention to ensure that a constant voltage level is available to the display unit. As a result, the distortions may be minimized or avoided.

In one embodiment, the correction circuit regulates the voltage source by providing a correction voltage. The correction circuit generates the correction voltage by examining the digital data representation of the images to be displayed. Based on the examination, the correction voltage determines the extent of correction necessary to maintain a constant voltage.

In one embodiment, the display unit comprises a cathode ray tube (CRT) display, and the constant voltage is the horizontal drive voltage (Hv) driving an anode. The anode, in combination with a cathode, attracts electrons generated by an electron source. When the electrons bombard a display screen, the images are generated. As the flow of electrons from cathode to the anode constitutes electric current, different strengths of electric current may be present between the anode and the cathode depending on the number of electrons flowing. Due to the resulting electric current, the voltage level applied at the anode may change unless a corrective action is taken.

The correction circuit provides the correction voltage to the voltage source to ensure that a substantially constant voltage is applied at the anode.

Thus, the present invention eliminates or avoids distortions, which may be otherwise present when images having adjacent horizontal blocks with sharp contrast are displayed. This is achieved by taking corrective measures to ensure that a substantially constant voltage is applied at the anode.

The present invention is particularly suited for low-cost applications as the implementations may not require expensive high voltage resistors and capacitors.

The present invention is also suitable for sophisticated, high-end systems as a designer has considerable flexibility in correction the voltage level applied to the anode. Such a flexibility exists because the correction voltage is determined by digitally processing the data elements representative of the displayed images.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

Figure 1:
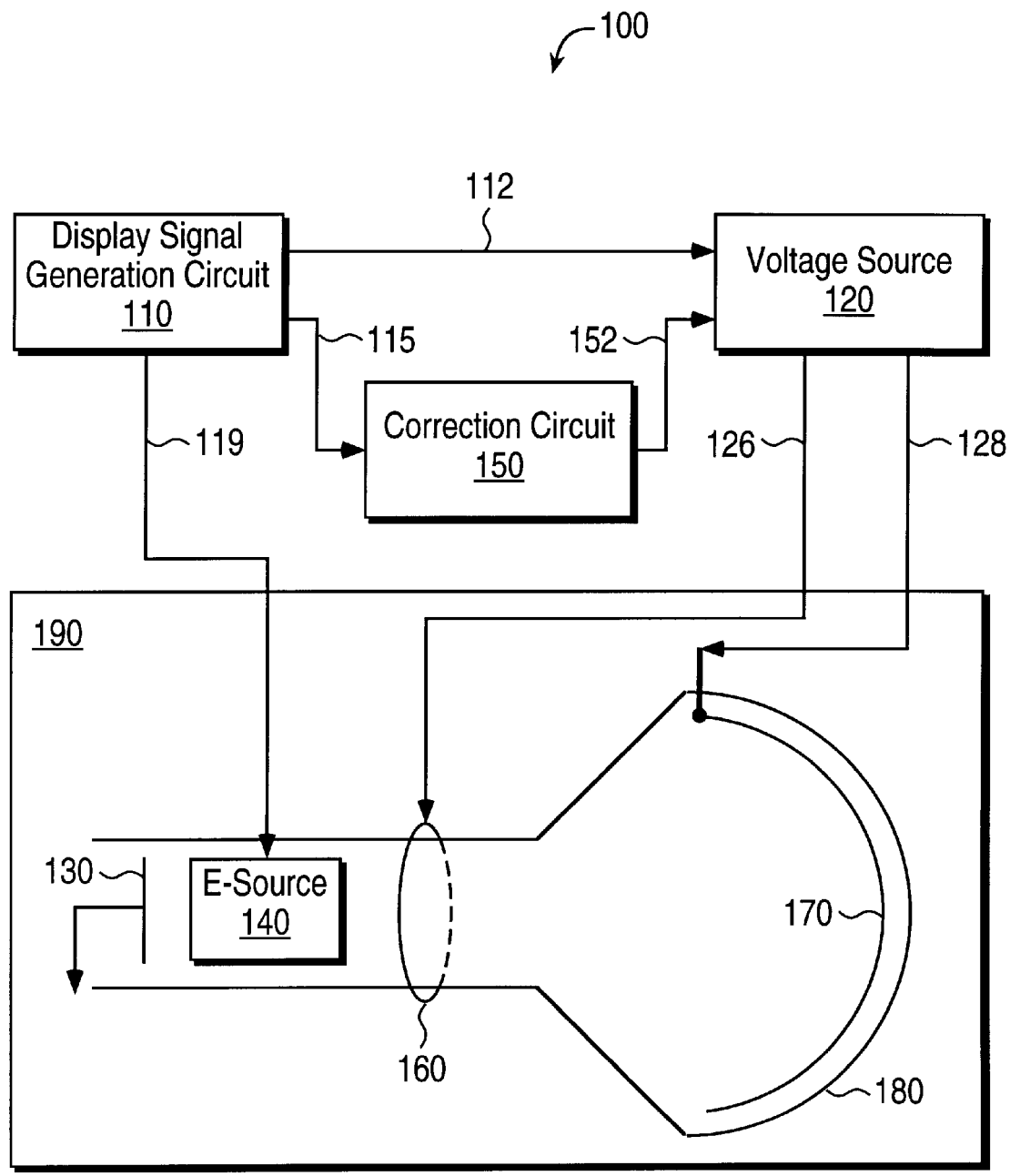
FIG. 1 is a block diagram of a television system illustrating one embodiment of the present invention.

The present invention is described in the context of television system 100 represented by the diagram of FIG. 1. Television system 100 includes display signal generation circuit 110, which generates a display signal for display by display unit 190. Voltage source 120 generates one or more voltage levels used by display unit 190 while displaying images encoded in the display signal.

In one embodiment, the display signal represents images encoded in a television signal (e.g., composite video signal), or network application data (e.g., those generated while accessing services such as web-browsing or email) or combination of the like. The television signal images and network application data images can be combined according to user specifications. In general, the display signal generated by display signal generation circuit 110 can have adjacent horizontal blocks with sharp contrast due to various types of images (not just the television signal images) being encoded in the display signal. One or more embodiments of display signal generation circuit 110 are described in RELATED APPLICATION 1 and RELATED APPLICATION 2 referred to in the section entitled "Related Applications", which are incorporated herein by reference in their entirety.

Display unit 190 displays the images encoded in the display signals generated by display signal generation circuit 110. In one embodiment, display unit 190 is implemented as a CRT unit, and the corresponding structure is represented in FIG. 1. Display unit 190 includes cathode 130, electron source 140, deflection coils 160, anode 170, and display screen 180. Electron source 140 receives display portion of the display signals on line 119 and generates electrons, which are usually proportional to the intensity of image portions to be displayed. Cathode 130 and anode 170 define an electric field which causes the generated electrons to move towards anode 170. To generate such an electric field, cathode 130 is typically grounded and anode 170 is connected to voltage source 120 by line 128.

Deflection coils 160 (also commonly known as yoke) cause the moving electrons to be deflected to various degrees under the control of voltage levels applied on line 126. The voltage levels are in turn determined by the synchronization signals (e.g., HSYNC, VSYNC) which provide spatial reference to the image points encoded in the display portions. As should be readily apparent, electrons directed to the corners of display screen 180 are deflected most, while electrons directed to the center are deflected least.

Voltage source 120 generates one or more voltage signals used by display unit 190 for displaying the encoded images. For a clear understanding, voltage source 120 is shown as generating the voltage signals 128 and 126 required for the operation of the specific embodiment of display unit 190. While displaying images having adjacent blocks with sharp color contrast, the voltage levels in display unit 190 can vary, leading to undesirable distortion of images. One of the voltage levels can vary due to, for example, the reasons described in the section entitled, "Background of the Invention" above.

Correction circuit 150 regulates the voltage source 120 in accordance with the present invention to ensure that the voltage levels used within display unit 190 do not vary substantially due to the presence of adjacent horizontal blocks with sharp contrast. Such a substantially constant voltage level ensures that any distortions (which may otherwise result) are minimized or eliminated.

Correction circuit 150 regulates voltage source 120 by applying a correction voltage on line 152. The strength of the correction voltage is determined by the display portion of the display signals. Specifically, correction circuit 150 examines the digital representation of the signals sent for display, and determines the existence of adjacent horizontal blocks with sharp contrast. As such horizontal blocks can alter the voltage levels applied in display unit 190, correction circuit 150 generates a correction voltage on line 152, which causes voltage source 120 to adjust the voltage levels generated to display unit 190 (e.g., lines 126 and 128).

As correction circuit 150 generates correction voltage by an examination of the digital data, designers are given considerable flexibility in regulating the voltage source. In addition, as implementations in accordance with the present invention may not require expensive components such as high voltage capacitors or resistors, the present invention is particularly suited for consumer applications where cost is of considerable significance.

An embodiment of correction circuit 150 is explained below in detail. The operation of correction circuit 150 can be appreciated well with a clearer understanding of the image distortions which may result without the operation of the present invention. Accordingly, such image distortions are first explained with reference to an example. An embodiment of correction circuit 150 is then explained.

2. Potential Image Distortions Without the Operation of the Present Invention

Figure 2:
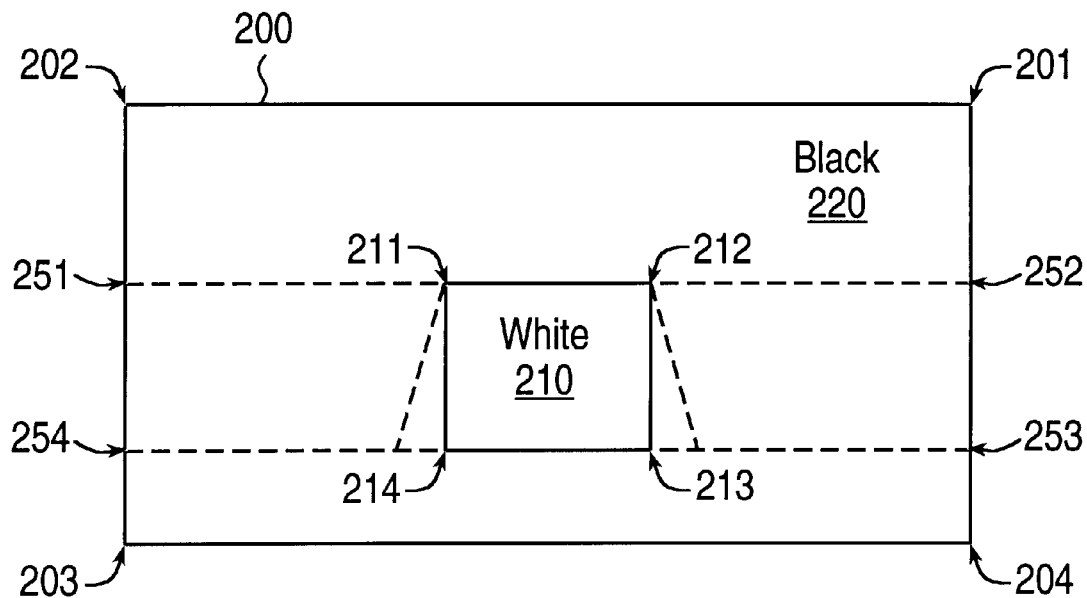
FIG. 2 is a diagram illustrating the potential distortions which may result when images with horizontal blocks having sharp color contrast are displayed on CRT displays.

FIG. 2 includes an example scenario illustrating the undesirable image distortions which may result without the operation of the present invention. The image desired to be displayed is shown as solid lines, and the distortions are shown in broken lines. In FIG. 2, area 200 (defined by points 201–204) represents the portion of the display screen typically used for displaying images. Area 200 is shown with rectangular white area 210 (all colors fully illuminated) surrounded by black area 220 (no illumination). White area 210 is defined by the points 211–214. Points 251 and 252 are on the same line points 211 and 212. Points 253 and 254 are on the same lines as points 213 and 214.

Area 200 may be viewed as having three horizontal blocks, the first block defined by points 201,202,251 and 252; the second block defined by points 251–254; and the third block defined by the points 203, 204, 253 and 254. Sharp color contrast is said to be present between the first block and the second block, and between the second block and the third block. Due to the unidirectional (up to down) scanning typically present in display units, the color contrast between the first block and the second block can cause display aberrations, which can be ameliorated or eliminated in accordance with the present invention.

Figure 3:
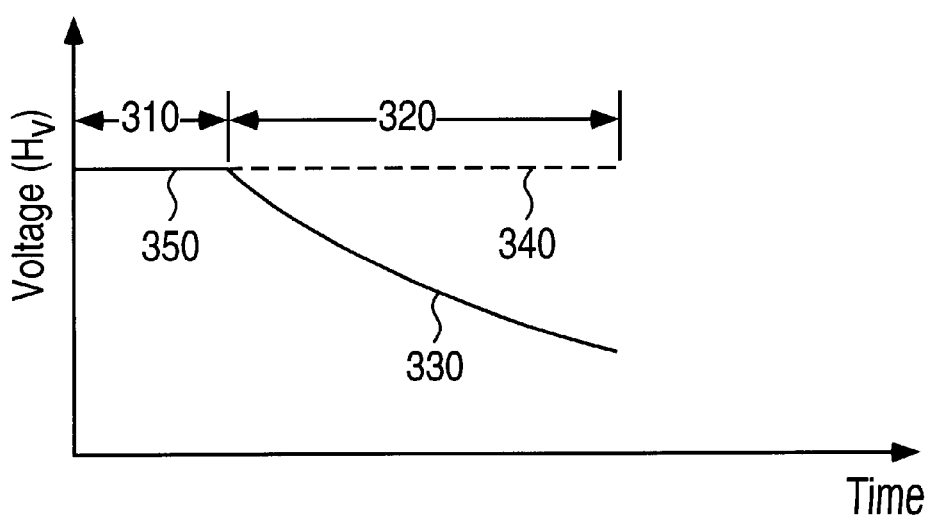
FIG. 3 is a diagram illustrating the change in the horizontal drive voltage when images having horizontal blocks with sharp color contrast are displayed on CRT displays.

The voltage fluctuations caused at anode 170 by the sharp color contrast between adjacent blocks are explained now with combined reference to FIGS. 1, 2 and 3. FIG. 3 is a timing diagram illustrating the typical voltage fluctuations in horizontal drive voltage (Hv) applied at anode 180 (i.e., applied by line 128) when the first and second blocks are scanned. The portion with dotted lines shows the desired voltage level of Hv. When accurately regulated, Hv is at a voltage level corresponding to the dotted lines.

When the horizontal lines covering the first block (part of black area 220) are being scanned, electric current is minimal (or non-existent) between anode 180 and cathode 130. Accordingly, the horizontal drive voltage (Hv) applied at anode is at a maximum value, which is shown as straight line 350. When horizontal lines covering the second horizontal block (including white area 210) also is scanned, there is electric current flow between anode 180 and cathode 110. As a result, the horizontal drive voltage level Hv decreases. The decrease in voltage level is illustrated by the curved portion 330.

The speed at which electrons travel from cathode 130 to anode 170 depends on the horizontal drive voltage Hv. When the voltage level Hv decreases while scanning image portion including white area 210, the electrons travel slower from cathode 130 to anode 170. Thus, the deflection coils deflect the electrons more (i.e., in error) than usual when the second horizontal block (including white area 210) is scanned. The erroneous amount of deflection is generally more at the edges due to the stronger deflection voltages.

The broken lines of FIG. 2 represent the boundary of the generated image in error. As can be readily observed, the generated image (i.e., defined with the broken lines) is distorted when compared with the accurate image (shown entirely with solid lines). This distortion may be undesirable.

Correction circuit 150 of FIG. 1 regulates voltage source 120 by generating a correction voltage on line 152. The correction voltage ensures that the horizontal drive voltage Hv remains substantially the same. Correction circuit 150 generates the correction voltage by determining the extent of sharp contrast in the images displayed on display screen 180. It will be apparent to one skilled in the relevant arts how to implement several embodiments of correction circuit 150 by reading the description herein. The general guiding principle is to counter or nullify the effect of horizontal blocks with sharp contrast on voltage fluctuations. An example implementation of correction circuit 150 will be explained in detail below.

3. Example Implementation of Correction Circuit 150

From the above description, it should be apparent that correction circuit 150 needs to generate a correction voltage, which will counter any voltage fluctuations caused by horizontal blocks with sharp contrast in the images. Schemes with various degrees of complexity and sophistication can be implemented to ensure that the horizontal drive voltage Hv remains substantially the same. These schemes can be based on an understanding of how the voltage level changes at the anode due to the presence of adjacent horizontal blocks with sharp contrast. An example implementation which generates correction voltage from RGB digital inputs will be described now with reference to FIG. 4. The RGB digital data typically represents the analog signals provided to electron source 140 on line 119.

Figure 4:
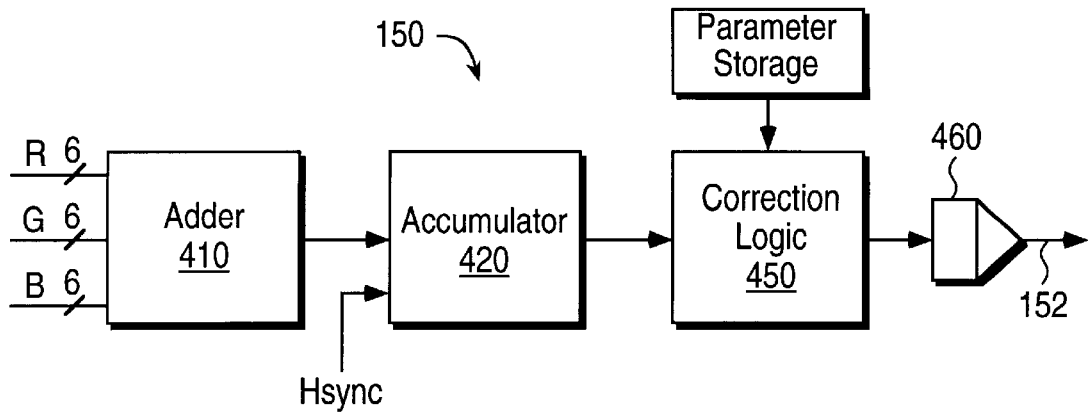
FIG. 4 is a block diagram of a correction circuit which regulates a voltage source in one embodiment of the present invention.

Correction circuit 150 of FIG. 4 includes adder 410, accumulator 420, parameters storage 440, correction logic 450, and digital-to-analog converter (DAC) 460. Adder 410 adds the RGB input values to determine the overall intensity of the point represented by each RGB set of data elements. Accumulator 420 adds the intensity values over one or more horizontal lines. Accordingly, HSYNC input is provided as an input to accumulator 420.

The output of accumulator 420 is provided as an input to correction logic 450. In one embodiment, correction logic 450 receives a single number from accumulator 420 for each line. The single number represents the average color intensity of each line. Correction logic 450 converts the received number into a correction voltage value. Correction logic 450 can include internal storage to store average intensity values of several previous lines. Some or all of these average intensity values can be used to generate correct voltage values.

Parameter storage 440 stores several values which help the correction logic 450 to determine the exact correction voltage value. The correction voltage value typically stays constant during each horizontal line. DAC 460 converts the correction voltage value into analog voltage. The converted analog voltage forms the correction voltage provided as input to voltage source 120 on line 152.

Thus, correction circuit 150 processes the digital data representing the displayed images to determine the presence and the extent of adjacent horizontal blocks with sharp contrast and the resulting changes in the voltage levels applied to anode 170. Then, correction circuit 150 generates a correction voltage to counter the changes.

Even though correction circuit 150 is described as examining the entire images to determine extent of sharpness between adjacent horizontal blocks, it should be understood that the determination can be based on part of the displayed images. For example, in an embodiment described in RELATED APPLICATION 2, the final image displayed is a combination of images encoded in television signals and images represented by network application data. However, the television signal images may not be converted into digital data representation. In such situations, the correction voltage can be generated based on an examination of network application data images alone to avoid the need for additional digital-to-analog converters. But, in general, examination of entire images leads to accurate regulation of voltage source 120.

The manner in which correction voltage operates in conjunction with an example implementation of voltage source 120 will be explained below.

4. Example Implementation of Voltage Source 120

Figure 5:
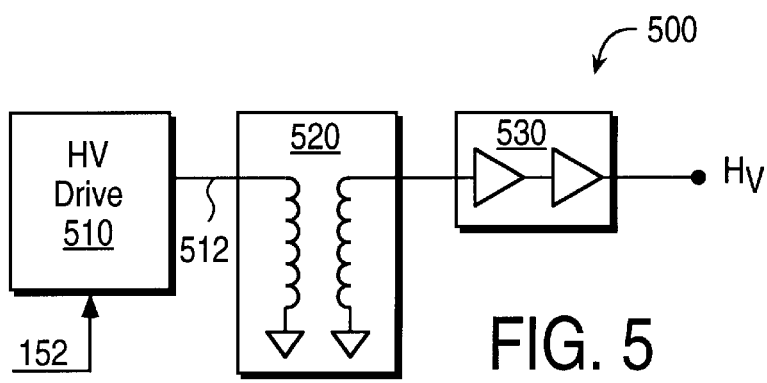
FIG. 5 is a block diagram illustrating the operation of a correction circuit with a voltage source in one embodiment of the present invention.

FIG. 5 is a block diagram illustrating an example implementation of voltage source 120 which ensures that a substantially constant horizontal drive voltage Hv is generated with an appropriate correction voltage value provided as input. Voltage source 120 includes HV-drive circuit 510, transformer 520, and rectifier 530.

HV-drive circuit 510 receives as input the synchronization signals and generates several voltages used by display unit 190. However, only the voltages that are relevant to the correction of the Hv voltage are shown in FIG. 5. The voltage on line 512 is transformed into a high voltage by transformer 520 and rectified by rectifier 530. The rectified voltage is provided as Hv to anode 170 of display unit 190.

HV-drive circuit 510 receives correction voltage as another input on line 152. The CVlow voltage causes HV-drive circuit 510 to alter the output voltage level on line 512. Thus, by properly setting the correction voltage as explained above, the voltage Hv can be maintained to be constant.

It should be understood that the above described method and apparatus for generating the correction voltage is relatively inexpensive as it can be implemented using a DAC and integrated circuits. The advantages can be better appreciated in comparison with another scheme typically used in high-end television systems and computer systems.

5. Alternative Implementations of Voltage Regulation

Figure 6:
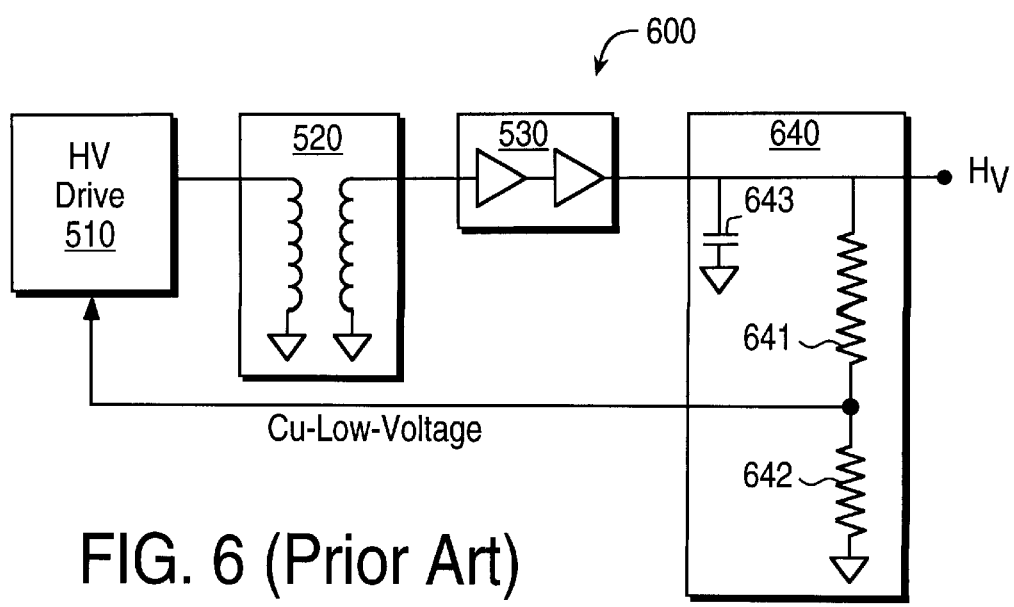
FIG. 6 is a block diagram illustrating a prior art alternative scheme in which voltage source is regulated.

FIG. 6 is a block diagram of a voltage source 600 used in some high-end television systems and computer systems. Elements similar to those in FIG. 5 are given the same reference numerals. In addition to the elements of FIG. 5, voltage source 600 comprises feedback circuit 640 which provides the correction voltage to HV-drive circuit 510. Feedback circuit 640 typically includes high-impedance 641, low-impedance 642 and capacitor 643. This combination provides the appropriate correction voltage to keep Hv relatively stable even during display of adjacent horizontal blocks with sharp contrast.

Unfortunately, feedback circuit 640 can be very expensive due to the relatively high cost of the resistances and capacitors. Therefore, voltage source 600 may be unsuitable for consumer television systems, where low cost is of particular importance.

In contrast, the combination of voltage source 120 and correction circuit 150 of the present invention provides a cost effective alternative. As should be apparent from the above description, the present invention regulates the voltage source by examining a digital representation of the displayed images, and providing a correction voltage to voltage source 120. In response, voltage source 120 generates a horizontal drive voltage (Hv), which remains substantially constant even during the display of adjacent horizontal blocks with sharp contrast. The present invention is summarized below with reference to FIG. 7.

6. Method of the Present Invention

Figure 7:
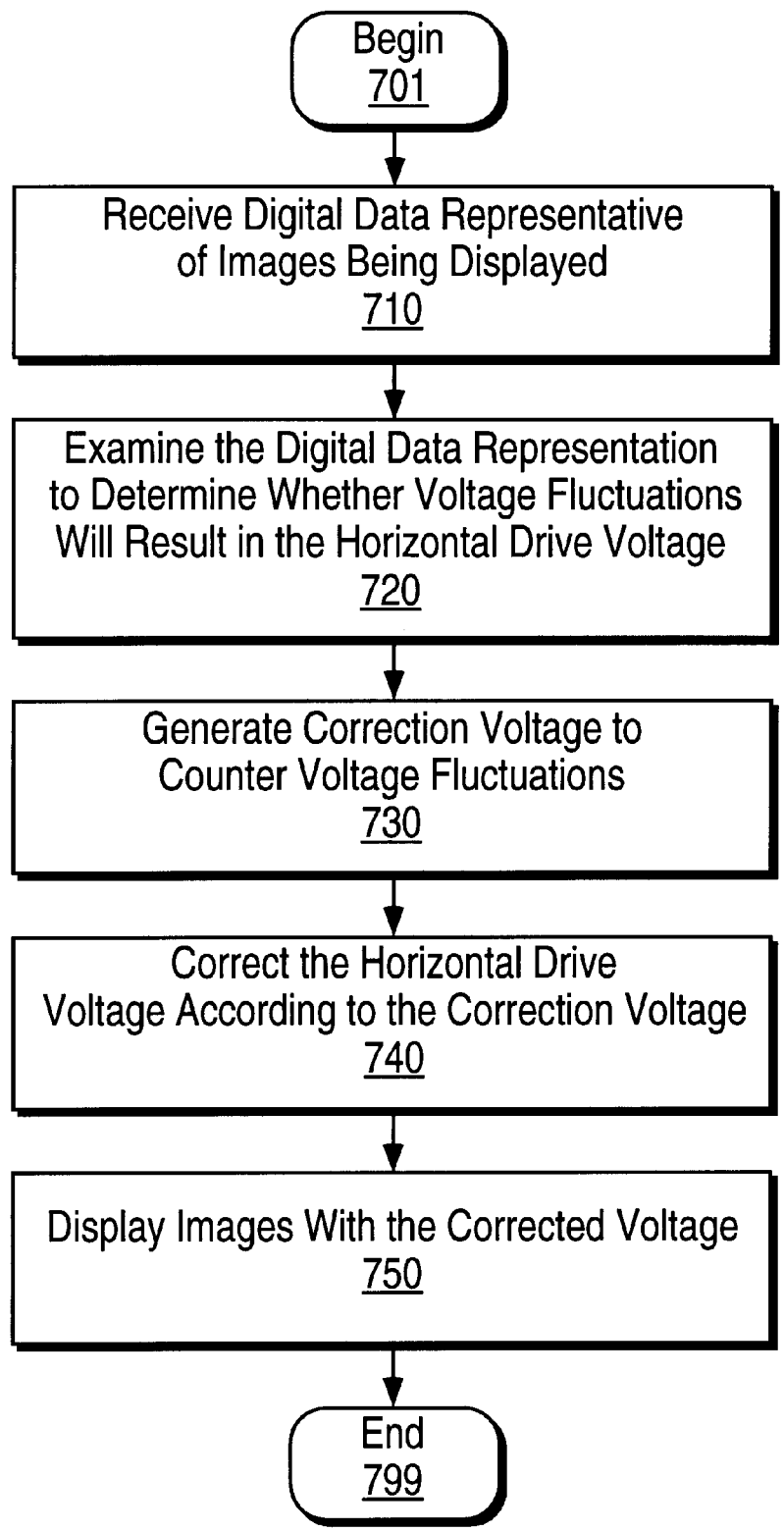
FIG. 7 is a flow chart illustrating the method of the present invention.

FIG. 7 is a flow-chart illustrating the method of the present invention. In step 710, digital data representation (e.g., RGB data) of the displayed images is received. In step 720, the received data is processed (or examined) to determine the extent of voltage fluctuations which may result if the images are displayed without correction. An example implementation for determining such voltage fluctuation is described above with reference to FIG. 4.

In step 730, a correction voltage proportional to the determined fluctuation is generated. In step 740, the horizontal drive voltage is corrected according to the correction voltage. The images are displayed using the corrected voltage in step 750. As the horizontal drive voltage is corrected, the speed of electron movement is not affected by sharp contrast present in adjacent blocks of the displayed image, and the undesirable distortions may be avoided. It should be understood that other types of correction signals can be employed to counter the distortions without departing from the scope and spirit of the present invention. The correction signal needs to be consistent with the overall correction scheme employed for correcting the distortions.

As solutions according to an aspect of the present invention may not require expensive capacitors or resistors, the solutions can be implemented in a cost-effective manner. As such, the present invention is particularly suited for consumer markets.

Further, designers have considerable flexibility in regulating the voltage source as the correction voltage is generated by digitally processing the pixel data elements representative of the displayed images. Such flexibility may make the present invention suited for sophisticated, high-cost systems also.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. In a television system including a cathode ray tube (CRT) display unit, wherein said CRT display unit includes an anode, a cathode, a deflection coil, a display screen, and an electron source, wherein a plurality of images are displayed on said display screen by bombarding electrons emitted by said electron source, wherein said anode and cathode drive said electrons from said electron source to said display screen, wherein said deflection coil deflects the electrons moving from said electron source to said display screen and wherein the amount of deflection is determined by a voltage level applied to said deflection coils using a voltage source, wherein any adjacent horizontal blocks with sharp contrast in said plurality of images cause said voltage level to change and thereby cause distortions in said images displayed on said display screen, a method of correcting said distortions, said method comprising the steps of:
   (a) examining a plurality of digital pixel data elements representing said plurality of images to determine the extent of contrast between adjacent horizontal blocks in said plurality of images; and
   (b) generating a correction signal to counter said distortions which may be otherwise caused such that said plurality of images are generated without any distortions.

2. The method of claim 1, wherein step (b) comprises the steps of:
   generating a correction voltage which is proportional to the extent of contrast between adjacent horizontal blocks, wherein said correction signal comprises said correction voltage; and
   applying said correction voltage to said voltage source such that said voltage level generated by said voltage source remains at a constant level irrespective of the presence of any adjacent horizontal blocks with sharp contrast in said plurality of images.

3. A television system comprising:
   a display signal generation circuit for generating a display signal representative of a plurality of images having adjacent horizontal blocks with sharp contrast;
   a voltage source for generating a voltage signal;
   a display unit coupled to said display signal generation circuit and said voltage source, said display unit using said voltage signal to display said plurality of images having adjacent horizontal blocks with sharp contrast, wherein the voltage level on said voltage signal changes when said display unit displays said plurality of images having adjacent horizontal blocks with sharp contrast, and wherein distortions result in the display of said plurality of images due to the changes in the voltage level of said voltage signal; and
   a correction circuit coupled to said voltage source and said display signal generation circuit, said correction circuit receiving a plurality of digital pixel data elements representative of said plurality of images, said correction circuit examining said plurality of digital pixel data elements to determine the changes in the voltage level of said voltage signal,
   said correction circuit sending a correction voltage to said display unit according to the determination of the changes in the voltage level, wherein said correction voltage regulates said voltage source to cause said voltage source to deliver said voltage signal having a substantially constant voltage level irrespective of the presence of adjacent horizontal blocks with sharp contrast in said plurality of images.

4. The television system of claim 3, wherein said display unit comprises a cathode ray tube (CRT) system, said CRT system comprising:
   a display screen for displaying said plurality of images in response to receiving a plurality of electrons;
   an electron source coupled to said display signal generation circuit, said electron source receiving a display portion included in said display signal, said electron source generating said plurality of electrons in response to receiving said display portion;
   a cathode and an anode for driving said plurality of electrons from said electron source to said display screen; and
   a deflection circuit for deflecting said plurality of electrons when said plurality of electrons move towards said anode;
   wherein said anode is coupled to said voltage source to receive a horizontal drive voltage, and wherein said horizontal drive voltage applied to said anode can change due the presence of said adjacent horizontal blocks with sharp contrast in said plurality of images, and
   wherein said correction circuit sends said correction voltage to said voltage source to ensure that said horizontal drive voltage remains substantially constant even when said plurality of images having adjacent horizontal blocks with sharp contrast are displayed.

5. The television system of claim 4, wherein at least a portion of each of said plurality of images represents network application data.

6. A television system comprising:
   a cathode ray tube (CRT) display unit, wherein said CRT display unit includes an anode, a cathode, a deflection coil, a display screen, and an electron source, wherein a plurality of images are displayed on said display screen by bombarding electrons emitted by said electron source, wherein said anode and cathode drive said electrons from said electron source to said display screen, wherein said deflection coil deflects the electrons moving from said electron source to said display screen and wherein the amount of deflection is determined by a voltage level applied to said deflection coils using a voltage source, wherein any adjacent horizontal blocks with sharp contrast in said plurality of images cause said voltage level to change and thereby cause distortions in said images displayed on said display screen; and
   a correction circuit for correcting said distortions, said correction circuit comprising:
      means for examining a plurality of digital pixel data elements representing said plurality of images to determine the extent of contrast between adjacent horizontal blocks in said plurality of images; and
      means for generating a correction signal to counter said distortions which may be otherwise caused such that said plurality of images are generated without any distortions.

7. The television system of claim 6, wherein said means for generating a correction signal comprises:
   means for generating a correction voltage which is proportional to the extent of contrast between adjacent horizontal blocks, wherein said correction signal comprises said correction voltage; and
   means for applying said correction voltage to said voltage source such that said voltage level generated by said voltage source remains at a constant level irrespective of the presence of any adjacent horizontal blocks with sharp contrast in said plurality of images.

8. The method of claim 1, wherein at least a portion of each of said plurality of images represents network application data, and wherein step (a) comprises the further step of examining a plurality of digital pixel data elements representing an image of said network application data to determine said extent of contrast in said plurality of images, wherein said plurality of digital pixel data elements representing an image of said network application data are comprised in said plurality of digital pixel data elements representing said plurality of images.

9. The method of claim 8, wherein at least a portion of each of said plurality of images represents television images encoded in a television signal, and wherein said method further comprises:

(c) generating a plurality of digital pixel data elements representing said television images, wherein step (a) is performed based on said plurality of digital pixel data elements representing said television images also.

10. The method of claim 8, wherein said television signal is received in analog form, and wherein step (c) comprises the step of generating said plurality of digital pixel data elements representing said television images.

11. The television system of claim 5, wherein at least a portion of each of said plurality of images represents television images encoded in a television signal, wherein said display data generation circuit generates a plurality of digital pixel data elements representing said television images.

12. The television system of claim 11, wherein said television signal is received in analog form, wherein said display data generation circuit generates said plurality of digital pixel data elements representative of said television images, and wherein said correction circuit examines said plurality of digital pixel data elements to determine said changes.

13. The television system of claim 7, wherein at least a portion of each of said plurality of images represents network application data.

14. The television system of claim 13, wherein at least a portion of each of said plurality of images represents television images encoded in a television signal, wherein said television system further comprises display data generation means for generating a plurality of pixel data elements representing said television images.

15. The television system of claim 14, wherein said television signal is received in analog form, wherein said display data generation means generates said plurality of digital pixel data elements representative of said television images, and wherein said correction circuit examines said plurality of digital pixel data elements to determine said changes.

* * * * *